United States Patent Office 3,553,220
Patented Jan. 5, 1971

3,553,220
CATALYTIC OXIDATIVE DEHYDROGENATION OF ALKYLPYRIDINES
Robert W. Etherington, Jr., Pennington, and Koei-Liang Liauw, Clark, N.J., assignors to Mobil Oil Corporation, a corporation of New York
No Drawing. Filed Apr. 23, 1968, Ser. No. 723,608
Int. Cl. C07d 31/20
U.S. Cl. 260—290                              8 Claims

ABSTRACT OF THE DISCLOSURE

Ethylpyridines are oxidatively dehydrogenated to the corresponding vinylpyridines by contacting an ethylpyridine and molecular oxygen-containing gas with a catalyst containing gold metal in the vapor phase (400–750° C.). The gold may be on a support. The vinylpyridine products can be polymerized and copolymerized to thermoplastic polymers useful for making extruded or molded shapes.

BACKGROUND OF THE INVENTION

Field of the invention

This invention relates to oxidative dehydrogenation. It is more particularly concerned with selective catalytic oxidative dehydrogenation of ethylpyridines to vinylpyridines.

Description of the prior art

As is well known to those familiar with the art, catalysts such as chromic oxide, iron oxide, and zinc oxides have been proposed for dehydrogenation of ethylpyridines to vinylpyridines. Insofar as is now known, however, it has not been proposed to produce vinylpyridines by the oxidative dehydrogenation of the corresponding ethylpyridine in contact with gold metal.

SUMMARY OF THE INVENTION

It is the discovery of this invention that vinylpyridines can be prepared by selective dehydrogenation. This invention provides a method for producing a vinylpyridine ester that comprises contacting an alkylpyridine reactant and a molecular oxygen-containing gas, in the vapor phase, with a catalyst comprising gold metal.

DESCRIPTION OF SPECIFIC EMBODIMENTS

The ethylpyridine reactant used in the process of this invention is ethylpyridine in which the ethyl radical can occupy any 2,3,4, or 5 position on the ring and which can also have one or more methyl radicals in the other positions. Typical ethylpyridine reactants are 2-ethylpyridine, 3-ethylpyridine, 4-ethylpyridine, 5-ethylpyridine, 2-methyl-5-ethylpyridine, 3-methyl-5-ethylpyridine, and 2-methyl-4-ethylpyridine.

In the process of this invention, the molar ratio of molecular oxygen to ethylpyridine reactant can be between 0.2 and 4, but preferably it is between 0.3 and 2. Pure oxygen can be used, but generally mixtures containing molecular oxygen are used, such as air, mixtures of air and oxygen, and mixtures of oxygen with nitrogen.

The catalyst utilized in the process of this invention comprises gold metal. It can be in the form or wire, gauze, pellets or coating on a support. The gold can be alloyed with other metals. The catalyst supports can be any inert refractory material such as alumina, silicon carbide, and alundum. When supported, the amount of catalytic metal in the catalyst can vary widely between about 0.5% and about 50% or more, by weight.

The oxidative dehydrogenation reaction of this invention is carried out in the vapor phase at temperatures varying between about 300° C. and about 850° C., preferably between about 400° C. and about 750° C. The contact time of ethylpyridine with the catalyst can be between about 0.001 sec. and about 20 sec. In the preferred continuous operation the ethylpyridine is charged at a LHSV (Volume liquid charge per volume catalyst per hour) of 0.1 to 20.

Any vessel suitable for carrying out exothermic vapor phase reactions is utilizable herein. The process can be carried out batch wise but it is more suitably carried out in a continous process. In such operation, unreacted ethylpyridine reactant can be recycled to extinction, after separation from the product.

EXAMPLE 1

A reactor constructed of ¾" I.D. x 16¾" stainless steel tube containing a concentric ¼" stainless steel thermocouple well, in a vertical position, was filled with 70 cc. of ⅛" x ⅛" alumina followed by 60 cc. of catalyst consisting of 10% gold deposited on 3/16" spheres of alumina. The reactor was heated with an electric tube furnace.

2-ethylpyridine was pumped at the rate of 1.1 ml./min. through a heated transfer line functioning as a vaporizor to the top of the reactor where it was mixed with air being pumped at the rate of 700 std. cc./min. The mixture of gases then passed through the heated catalyst bed. The maximum temperature of the catalyst bed was 580° C. The product was condensed in a series of condensers and was found to contain 4.4% 2-vinylpyridine and 91.5% unreacted 2-ethylpyridine.

EXAMPLE 2

With the same reactor as in Example 1, 2-methyl-5-ethylpyridine fed at 1.5 ml./min. and air fed at 1300 std. cc./min. were preheated, mixed and then passed through the reactor. The maximum temperature of the catalyst bed was 705° C. The product contained 4.5% 2-methyl-5-vinylpyridine and 87.6% unreacted 2-methyl-5-ethylpyridine.

EXAMPLE 3

A reactor like that of Example 1, was filled with 30 cc. of ⅛" x ⅛" of alumina followed by 100 cc. of catalyst consisting of 10% gold deposited on 3/16" spheres of alumina. 4-ethylpyridine fed at 1.1 ml./min., air fed at 700 std. cc./min., and nitrogen fed at 700 std. cc./min. were preheated, mixed, and then passed through the reactor. The maximum temperature of the catalyst bed was 575° C. The organic product contained 7.3% 4-vinylpyridine and 92.7% unreacted 4-ethylpyridine.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The process for producing vinylpyridine and methyl-substituted derivatives thereof that comprises contacting, in the vapor phase, ethylpyridine in which the ethyl radical can occupy any 2,3,4, or 5 position and which can also have one or more methyl radicals in the other positions and a molecular oxygen-containing gas with metallic gold catalyst or supported gold catalyst containing 0.5–50 weight percent gold on an inert support, at a temperature of between about 300° C. and about 850° C.

2. The process defined in claim 1, wherein said catalyst is 0.5–50 weight percent gold on an inert refractory support.

3. The process defined in claim 1, wherein said ethylpyridine is 2-ethylpyridine.

4. The process defined in claim 3, wherein said catalyst is 0.5–50 weight percent gold on alumina.

5. The process defined in claim 1, wherein said ethylpyridine is 2-methyl-5-ethylpyridine.

6. The process defined in claim 5, wherein said catalyst is 0.5–50 weight percent gold on alumina.

7. The process defined in claim 1, wherein said ethylpyridine is 4-ethylpyridine.

8. The process defined in claim 7, wherein said catalyst is 0.5–50 weight percent gold on alumina.

References Cited

UNITED STATES PATENTS 3,344,143   9/1967   Sudhoff _____ 260—290

HENRY R. JILES, Primary Examiner

H. I. MONTZ, Assistant Examiner

U.S. Cl. X.R.

252—476